J. WEBSTER.
Apparatus for Silvering Looking Glasses.
No. 12,840.    Patented May 8, 1855.
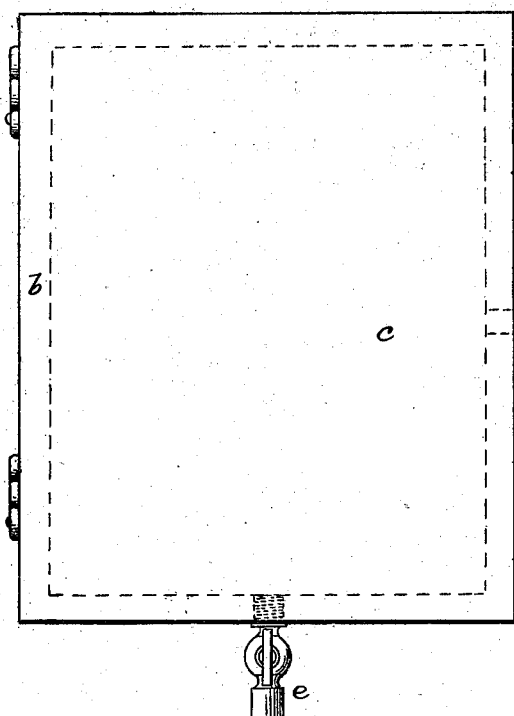
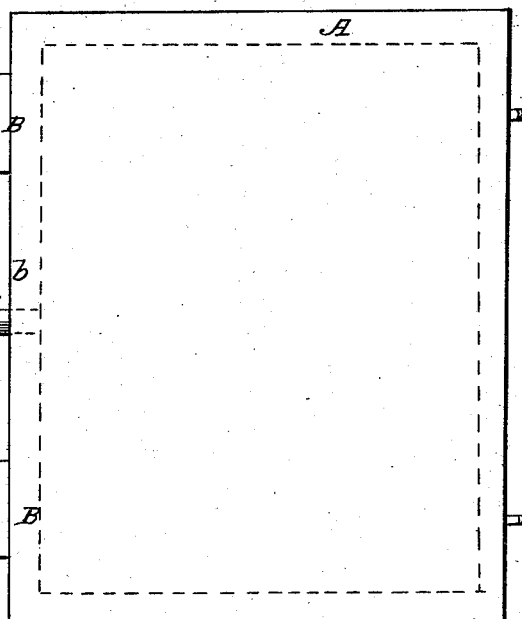
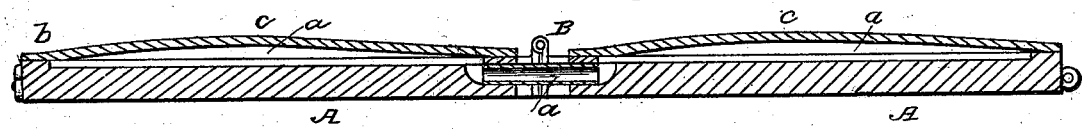
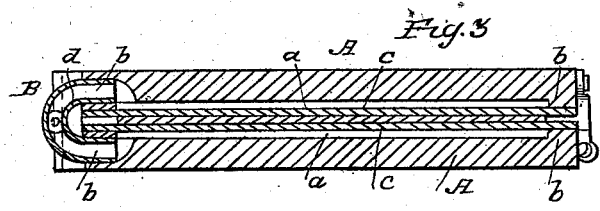

UNITED STATES PATENT OFFICE.

JOEL WEBSTER, OF BROOKLYN, NEW YORK.

IMPROVEMENT IN SILVERING LOOKING-GLASSES.

Specification forming part of Letters Patent No. 12,840, dated May 8, 1855.

*To all whom it may concern:*

Be it known that I, JOEL WEBSTER, of the city of Brooklyn, in the county of Kings and State of New York, have invented a new and useful Apparatus for Silvering Looking-Glasses; and I do hereby declare that the following is a full, clear, and exact description of the same, reference being had to the accompanying drawings, forming part of this specification, in which—

Figure 1 is a plan of the apparatus extended to receive the glass. Fig. 2 is a section of the same in the same state, and Fig. 3 a section closed with the glass within it.

Similar letters of reference indicate corresponding parts in the several figures.

This invention is intended for the silvering of the common kinds of glass, which, by reason of their unevenness of surface, will not bear pressure upon a hard flat table—such as is employed to receive the plate-glass—to have the silvering process performed upon it.

The apparatus forming the subject of the invention consists of two tables with elastic faces, one to receive the silvering preparation and the sheet of glass and the other to receive and transmit the necessary pressure to the glass. These tables are connected in such manner as to facilitate the operation as much as possible.

A A are two tables, which I make of wood, but which may be made of other material. The tables are of equal size, somewhat larger than the largest sheets of glass required to be silvered, and are connected together by hinges B B, so as to lie face to face or to be thrown apart, as desired. A slight cavity $a$ is made in the face of each, as shown in Figs. 2 and 3 and by dotted lines in Fig. 1, leaving only a narrow raised margin $b$ all around to which to secure a covering $c$ of sheet india-rubber, within which a quantity of air is to be confined to form an elastic cushion. A flexible pipe $d$ communicates between the cavities in the two tables, in order that by forcing air into the cavity of one table the cavities of both may be filled and that an equal pressure may always be maintained in both. One table is provided with a suitable nozzle or mouth-piece $e$, through which to fill the cavities with air, and this nozzle is fitted with a cock or other device by which it may be closed to confine the air.

To silver a sheet of glass the tables A A are laid apart or opened, as shown in Figs. 1 and 2, and laid upon any suitable fixed table or bed, and one of them is prepared with tinfoil and quicksilver or other preparation in the same manner as the flat table employed in silvering plate-glass. The sheet of glass to be silvered is then laid upon the preparation, and the other table is thrown over upon it, as shown in Fig. 3, where $f$ represents the glass, and the necessary pressure is given to the glass either by weights placed on the back of the upper table or by drawing the two tables together and securing them by suitable appliances.

The yielding and elastic characters of the faces of the tables A A will effectually prevent the breaking of the sheets of glass, however much they may deviate from a plane figure, and at the same time will insure a uniform and proper degree of pressure being given to every part of the sheet when a suitable weight or pressure is applied to the back of the upper table. It may be proper to remark that the same character may be given to the faces of the tables by the employment of elastic substances without air-cavities; but this I should regard as equivalent.

What I claim as my invention, and desire to secure by Letters Patent, is—

1. The two tables A A, having elastic faces and being employed in combination with each other, substantially as and for the purpose described.

2. When the requisite elasticity is given to the faces of the tables A A by the employment of an air-packing, connecting the air-cavities $a\ a$ by means of a flexible tube $d$, as described, by which means both cavities are caused to be filled with air at once and to contain a uniform pressure.

JOEL WEBSTER.

Witnesses:
JAS. GEO. MASON,
WILLIAM TUSCH.